US008827206B2

(12) United States Patent
Van Speybroeck et al.

(10) Patent No.: US 8,827,206 B2
(45) Date of Patent: Sep. 9, 2014

(54) WING FOR AN UNMANNED AIRCRAFT

(71) Applicant: Gatewing NV, Ghent (BE)

(72) Inventors: Maarten Maurits Van Speybroeck, Zwijndrecht (BE); Peter Hendrik Cosyn, Geraardsergen (BE); Maarten Willem Vandenbroucke, Ghent (BE)

(73) Assignee: Gatewing NV, Ghent (St Denijs Westrem) (BE)

( * ) Notice: Subject to any disclaimer, the term of this patent is extended or adjusted under 35 U.S.C. 154(b) by 56 days.

(21) Appl. No.: 13/655,382

(22) Filed: Oct. 18, 2012

(65) Prior Publication Data

US 2013/0228645 A1    Sep. 5, 2013

Related U.S. Application Data

(63) Continuation of application No. PCT/EP2011/051874, filed on Feb. 9, 2011.

(30) Foreign Application Priority Data

Apr. 19, 2010 (EP) .................... 10004112

(51) Int. Cl.
    B64C 1/00      (2006.01)
    B64C 3/00      (2006.01)
    B64C 5/00      (2006.01)

(52) U.S. Cl.
    USPC .................................... 244/123.14

(58) Field of Classification Search
    USPC ............ 244/65, 119, 123.14, 124, 123.9
    See application file for complete search history.

(56) References Cited

U.S. PATENT DOCUMENTS 7,828,246 B2 * 11/2010 Ashton et al. ............ 244/124
2004/0195438 A1 * 10/2004 Chamberlain ............ 244/65

FOREIGN PATENT DOCUMENTS

| CA | 1 059 487 A1 | 7/1979 |
| DE | 24 49 932 A1 | 4/1976 |
| EP | 1 666 356 A1 | 6/2006 |
| FR | 2 920 745 A1 | 3/2009 |
| WO | WO 2011/131382 A1 | 10/2011 |

OTHER PUBLICATIONS

Notification of Transmittal of the International Search Report and the Written Opinion of the International Searching Authority, or the Declaration; International Search Report and Written Opinion of the International Searching Authority for corresponding International Application No. PCT/EP2011/051874 mailed on Oct. 6, 2011, 12 pages.

* cited by examiner

*Primary Examiner* — Valentina Xavier
(74) *Attorney, Agent, or Firm* — Kilpatrick Townsend & Stockton LLP

(57) ABSTRACT

A single wing for an unmanned aircraft adapted for image acquisition, surveillance or other applications consists of a ribbed frame and a foam wherein the ribbed frame is integrated during molding for stiffness and strength. The foam has a container for holding the electric and/or electronic components. The foam constitutes the outer layer of the unmanned aircraft at impact side. The wing can be produced at low cost and low complexity in large volumes, increases the impact resistance and safety when used in civil areas, and is removable and disposable thereby enabling reuse of the electric and/or electronic components.

12 Claims, 4 Drawing Sheets

WING FOR AN UNMANNED AIRCRAFT

CROSS-REFERENCES TO RELATED APPLICATIONS

The present application claims priority to and is a continuation of International Patent Application PCT/EP2011/051874, which claims priority to EP Patent Application No. 10004112.8, filed Apr. 19, 2010, entitled "A WING FOR AN UNMANNED AIRCRAFT". The contents of these applications are hereby incorporated by reference.

BACKGROUND

The present invention generally relates to unmanned aircrafts for image acquisition applications like for instance digital terrain modelling, i.e. the digital production of topographic maps used for infrastructure planning like mines, volume calculation of large deposits such as dredge deposits, urban construction planning, land reclamation or vegetation monitoring in the agro-industry, etc. The unmanned aircraft with wing according to the current invention is also useful in other applications, like for instance real-time surveillance. The invention in particular concerns efficient production of a safe, impact resistant, and disposable wing for such unmanned aircrafts.

Topographic data that are essential for planning and decision making in various applications can be collected either manually through on-site measurements using Global Positioning System (GPS) transceivers, photogrammetry, terrestrial scanners, LIDAR technology, or via image acquisition using a high resolution digital camera aboard a small unmanned aircraft system (UAS). Usually, a grid density with decimetre accuracy or better is required.

Despite its limitations, terrestrial surveying is at present still the common approach for gathering elevation data of a terrain that has to be modelled. A ground surveyor can measure a few tens or even hundreds of points a day using state of the art GPS technology. Such manual, on-site surveying however requires a human accessible terrain and may be dangerous. The presence of the surveyor may conflict with ongoing operations and/or the surveyor may be at risk due to the nature of the terrain, e.g. a minefield, construction area, zone with collapsed buildings as a result of an explosion, etc. The resolution that can be obtained with terrestrial topographic surveying is limited due to the inherent limited number of measurable points. The resolution or level of detail can only be increased by adding manual measurements. These manual measurements typically hit the boundaries of scalability when the project requires thousands or more points to be measured. The data acquisition effort increases linearly with the expected resolution and with the size of the area that is surveyed. As a consequence, manual surveying on-site becomes too expensive and too time consuming in most cases.

LIDAR or LIght Detection And Ranging is an optical remote sensing technique that measures properties of scattered light in order to find the range of a distant target. Terrestrial LIDAR technology, e.g. a fixed scanner or mobile scanner, is bound to the same limits as the terrestrial surveyor. Moreover, image extraction for Digital Terrain Modelling is rather difficult due to the angle whereat the data are captured. Using an airplane or helicopter as moving platform, LIDAR allows 3D terrain mapping. The need for costly equipment such as an accurate Inertial Navigation System and the integration thereof in an aircraft, limits the applicability and market penetration of LIDAR.

As mentioned here above, an alternative to manual on-site measurements consists in image acquisition using an unmanned aircraft system (UAS) equipped with a high resolution camera. Such unmanned aircraft can scan a predefined area and real-time transmit the captured images, e.g. in case of surveillance, or locally store the captured images for later processing. From launch to landing, the flight can be conducted fully automatically. The unmanned aircraft has a typical flight altitude of 100 to 300 m, has a typical coverage of a few $km^2$, and has digital cameras aboard that enable to model the terrain with centimetre resolution. As a consequence, the unmanned aircraft may collect data on a few hundred thousands of measurement points during a single flight of for instance 30 minutes. The unmanned aircraft scans the terrain that has to be modelled through parallel sweeps and consecutive, overlapping camera shots. A ground control station can monitor the flight and eventually also performs a remote image quality check. In case of topographic mapping, the collected data is a set of pictures tagged with GPS coordinates of the respective locations where the pictures were taken. The number of pictures obviously depends on the size of the terrain and the required resolution.

The technical problems where designers of small unmanned aircrafts for image acquisition applications cope with are size and weight, robustness, weather and wind sensitivity, impact resistance, lifetime, cost and complexity for mass production.

A prior art unmanned aircraft for remote image acquisition is the Airborne Vehicle System (AVS) from Air Robotics. The AVS is described and pictured in various press releases, starting 5 Aug. 2009. These press releases can be retrieved from the Internet via the following URL:

http://airrobotics.wordpress.com/

The AVS can carry electro-optical, infrared and chemical sensors to provide real-time images of an area for surveillance and reconnaissance applications. In order to make the AVS impact tolerant, Air Robotics has developed a fuselage and tail group out of lightweight, energy dissipating materials. As is illustrated by the press release of 7 Aug. 2009, the AVS consists of a foam core that is cut—i.e. a moldless construction method—and a protective sheet or layer. The lightweight foam enables the AVS to carry a heavier payload while surviving crashes.

Air Robotics' AVS is disadvantageous for several reasons. Firstly, cutting a foam core, as is required in Air Robotics' moldless construction method, requires time-consuming, manual production steps. Airborne's AVS in other words cannot be manufactured efficiently in large volumes. In particular, the application of a protective sheet or laminate covering the core foam of the AVS is a time-consuming step that complicates the production process. Moreover, this laminate or protective cover renders the AVS unsafe when used in civil areas. Although Airborne's unmanned aircraft seems to survive a crash test, a human being, animal or object hit by the AVS in case of a crash, will not survive or at least be heavily injured as a result of the impact of the hard external layer. Further, Airborne's laminated foam core does not allow recovering the expensive electronics inside, like for instance the high resolution digital camera, the battery, etc. Whereas the lifetime of the wing may be expected to be limited to a few tens of flights, e.g. 20 to 50 flights, the expensive electronics carried by the unmanned aircraft will have a typical lifetime that is at least a tenfold thereof. Since batteries can be recharged more than thousand times, digital cameras have a life duration of more than thousand hours of operation, and control electronics even have lifetimes of 10.000 hours or more, the electronics inside an unmanned aircraft for image acquisition applications can at present safely survive hundreds, possibly even thousands of flights.

In summary, Air Robotics' AVS is complex and expensive to manufacture, cannot be used safely in civil environments, and does not allow recovery of the expensive electronics inside for reuse as long as their lifetime permits.

The PCT Patent Application WO 2004/060743 from the University of Florida, published on 22 Jul. 2004 and entitled "Bendable Wing for Micro Air Vehicle" describes another wing for an unmanned aircraft that is designed to be outfitted with still frame cameras and video cameras for image acquisition in military applications. As is illustrated by FIG. 1 of WO 2004/060743, the wing consists of a ribbed support structure covered by a layer or sheet of resilient material such as latex. This way, the wing is designed to resist flexing upwards during a flight, and is bendable downward in such manner that the aircraft can be stored in a compact cylindrical volume that is carried by military personnel, for instance in their backpack.

Just like Air Robotics' AVS, the wing known from WO 2004/060743 is complex to manufacture. Each rib of the support structure has to describe the exact shape of the airplane and therefore has to be produced manually. Although the unmanned airplane based on the known wing is foldable, it is not impact resistant and also not safe for use in civil environments. The thin latex layer or alternate resilient sheet does not protect a human being or any other object that is hit by a crashing plane from being injured heavily. Further, the wing cannot be removed easily thereby saving expensive electronic components inside the aircraft for reuse.

U.S. Patent Application Ser. No. US 2004/0195438 describes a light weight and impact resistant flying wing toy made out expanded polypropylene (EPP). The airframe stiffness is increased through one or more spar shafts that are embedded inside the EPP wings, e.g. an elongated wing stiffening spar 20 that is mounted inside the wing.

The flying wing toy known from US 2004/0195438 is rather complex to produce. Typically, the wings are cut out of an EPP core in a moldless step that is time-consuming and labour-intensive. Thereafter, as mentioned in paragraph [0044] of US 2004/0195438, holes are drilled in the EPP wings to enable the stiffening spar 20 to be mounted. The drilling and mounting of the spar constitute additional steps that complicate mass-production of the flying wing toy. A further disadvantage of drilling holes in EPP and passing a spar therethrough is the unavoidable absence of adhesion between the EPP granules and the spar. As a consequence thereof, the spar shall be able to swivel or rotate resulting in non-optimal strength, rigidity, and torsion stiffness of the flying wing toy.

It is further noticed that the flying wing toy known from US 2004/0195438 is not adapted for image acquisition or surveillance application. It does not have a container to hold image acquisition or surveillance electronics, is therefore more lightweight by nature, and consequently does not suffer from safety and impact resistance constraints that are comparable to those faced by unmanned aircrafts used for image acquisition and surveillance applications.

An additional consequence of the fact that this wing toy is not adapted for image acquisition or surveillance applications, is that the flying wing toy known from US 2004/0195438 is not designed to be removable and replaceable with reuse of electronics.

French Patent Application FR 2 920 745 entitled "Drone Modulaire a Sous-Ensembles Détachables" describes an unmanned aircraft that comprises wings (2 in FIG. 1) made of expanded polypropylene and an elongated stiffness bar (34 in FIG. 2). The unmanned aircraft is designed for image acquisition applications with a container for holding image acquisition electronics (5 in FIG. 2). The aircraft known from FR 2 920 745 contains a multiple of components, some of which are detachable for transport, like the wings. These detachable components render the aircraft less robust and complex to produce.

The production process for the aircraft is complex and time consuming in general. Just like the wing toy known from US 2004/0195438, the wings are cut out of an EPP core, typically through a hot-wire process, and the stiffness bar is placed after a hole is drilled in the EPP wings. These steps typically require manual handling and are therefore not suitable for mass production.

The elongated bar 34 increases the torsion stiffness of the aircraft but does not constitute a support structure that prevents all types of deformation. The adhesion between the stiffness bar and EPP granules of the wings is poor as a result of the production process. The stiffness bar therefore can swivel or rotate.

It is an objective of the present invention to provide a wing for an unmanned aircraft used in image acquisition applications that overcomes the above mentioned shortcomings of the prior art solutions. More specifically, it is an objective to disclose a wing that can be produced at low cost and complexity in large volumes. It is a further objective of the current invention to disclose a wing and unmanned aircraft that are impact resistant and safe for use in civil neighbourhoods. It is a further objective of the invention to disclose a low cost wing that is easily removable and disposable thereby enabling reuse of expensive electronic components such as cameras, batteries, etc. that typically have a larger lifetime than the wing.

SUMMARY

According to the current invention, the above mentioned objectives are realized and the shortcomings of the prior art solutions are resolved through a single wing for an unmanned aircraft adapted for image acquisition or surveillance as described in an embodiment, the single wing comprising:
a ribbed frame; and
a foam wherein the ribbed frame is integrated during molding for stiffness and strength, the foam having a container for holding electric and/or electronic components, and the foam constituting at least at impact side the outer layer of the unmanned aircraft.

Thus, the wing according to the invention is a lightweight structure that consists of a ribbed frame that provides stiffness and strength, and a foam that serves as a protective container for electronics. Since the ribbed frame is integrated in the foam in such a manner that the foam constitutes the outer layer on impact side, i.e. front side of the aircraft's fuselage and front side of the aircraft's wings, the foam enhances the impact-resistance of the aircraft, i.e. the ability to withstand the impact of rough terrain during landing or for instance a bird or small object that is hit during a flight. Even more important, the impact absorbing foam also makes the wing safe for use in civil neighborhoods. The chances that a human being or animal will be deadly wounded or heavily injured and the chances that buildings or objects will suffer substantial damage in case they are hit by an aircraft with wing according to the current invention, for instance after a crash, are substantially reduced in comparison with traditional unmanned aircraft vehicles that have hard surface materials on impact side. The inherently safe unmanned aircraft based on the wing according to the current invention minimizes the risk for havoc or injuries. This is a crucial requirement for acquiring flight permits and insurance for civil or commercial tasks.

During production, the ribbed frame is spanned. Thereafter, using a mold, the foam is die-casted to surround and integrate the ribbed frame and to form the container. This way, the production process becomes non-complex, cost-efficient and suitable for mass production.

The single wing according to the invention is adapted for image acquisition applications where images are captured using a still digital camera, the images being processed later, or surveillance applications where moving images are captured and real-time transferred.

According to an optional aspect of the wing, described in an embodiment, the single wing is removable and replaceable without disposing said electronic components.

Indeed, an advantageous embodiment of the wing according to the invention can be removed and replaced, e.g. through cutting the foam, without loss of the electronic components. Whereas the wing with ribbed frame and foam has an average lifetime of a few tens of flights, the lifetime of the expensive electronics like cameras, batteries, etc. is at least a magnitude of order larger. Typically, these electronic components shall have a lifetime of 1000 flights or more. Whereas current unmanned aircrafts must be disposed entirely, the container structure of the wing according to the present invention enables to remove and dispose the relatively inexpensive wing and replace it with a new wing, thereby recuperating the expensive electronics.

The wing according to the current invention may comprise a substantially large central portion holding the container and two side-parts whose respective front sides form part of the foam.

Thanks to its relatively large central portion, the impact surface in case of a crash is relatively wide as a result of which the local impact is further reduced. The combined effect of the resilient foam and the relatively wide impact surface consequently further improves the safety of the wing when used in civil areas, and obviously also improves the impact resistance of the unmanned aircraft when hit by an object during a flight.

As described in an embodiment, the container in the single wing according to the present invention optionally contains at least three compartments:
- a front section for holding a battery;
- a middle section for holding a camera; and
- a rear section for holding electronic control circuitry.

These three sections preferably form the central portion or fuselage of the unmanned aircraft. By positioning the battery in a front section, the camera in a middle section and the control circuitry in the rear section, the stability of the unmanned aircraft is improved substantially. An unmanned aircraft with wing according to the current invention can perform survey operations in winds up to 6 Beaufort. The unmanned aircraft based on the shock-absorbing, robust wing structure according to the invention has a typical weight below 2 kg, and is equipped with electric propulsion. The container may therefore contain a fourth section holding the motor, or the motor may be positioned in the rear section, together with the electronic control circuitry.

According to a further optional aspect described in an embodiment, the container in the single wing according to the present invention comprises a lid enabling to access the electronic components.

This way, the electronic components are repairable or replaceable in a convenient manner. The lid may open and close through a screw, a hinge, a film hinge, a clip, a clamp, a spring, etc. or a combination of the foregoing.

As described in an embodiment, the ribbed frame in the single wing according to the present invention may comprise one or more of the following materials:
- carbon;
- aluminum;
- fiber glass;
- plastic;
- wood; and
- composite material.

The choice of the material of the ribbed frame will be made depending on the weight constraints, the desired robustness, stiffness, rigidity, torsion stiffness, etc. The ribs may have circular, ellipsoidal, rectangular, I, or T profiles. The choice of the profile may be influenced by the torsion stiffness or flexural rigidity requirements. In case of I or profiles for instance, the foam will be fixedly molded around the ribbed frame and no longer be able to rotate or swivel.

As is described in an embodiment, the foam in the wing according to the present invention may comprise one or more of the following materials, or a mixture thereof:
- polystyrene;
- polypropylene;
- expanded polypropylene or EPP.

The choice of the material of the foam will be made depending on the weight constraints, its resilience or shock absorbing capacity, the ability to use the material in an injection molding process, its weather resistance, the expected lifetime. The weather resistance of the foam may be enhanced through painting or coating the surface with a material that does not deprive the resilient, impact-absorbing nature of the foam.

In addition to a wing as described in an embodiment, the present invention also concerns an unmanned aircraft as described in an embodiment, comprising a single wing according to the invention and comprising in the container:
- a battery;
- image acquisition electronics;
- control electronics;
- an engine.

Indeed, the unmanned aircraft according to the invention shall typically have an electric propulsion driven by a battery. The image acquisition electronics may consist of various types of sensors. One example is a high resolution digital still camera but the invention is obviously not limited thereto. The control electronics shall control the engine and flight scheme of the aircraft, as well as the image acquisition electronics.

DETAILED DESCRIPTION

Figure 1:
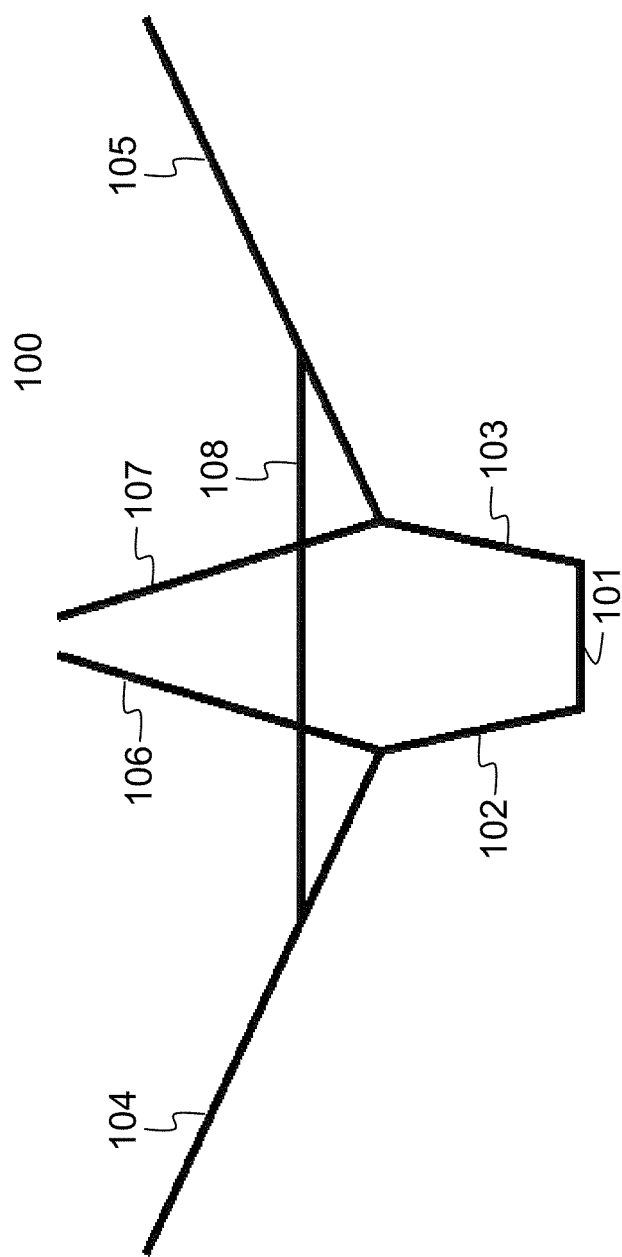
FIG. 1 illustrates the ribbed frame in an embodiment of the wing according to the present invention.

FIG. 1 shows the ribbed frame structure 100 that provides robustness, torsion stiffness and rigidity to an embodiment of the wing according to the invention. The ribbed frame 100 consists of carbon ribs with circular profile that are interconnected through plastic T-pieces in the respective joints. In particular, the ribbed frame 100 shown in FIG. 1 consists of a nose rib 101, a front starboard rib 102 and a front portside rib 103 that are connected to the nose rib 101 through plastic joints. The ribbed frame 100 further contains a right wing rib 104 and a back starboard rib 106 that are both interconnected with the front starboard rib 102 through a plastic T-piece. Similarly, the ribbed frame 100 contains a left wing rib 105 and a back portside rib 107 that are both interconnected with the front portside rib 103 through a second plastic T-piece. In order to improve the torsion stiffness and rigidity of the ribbed frame 100, the right wing rib 104 and left wing rib 105 are interconnected through an additional carbon rib 108. Thereto, the right wing rib 104 and left wing rib 105 are each constituted of two parts that are interconnected through third and fourth T-pieces. These T-pieces enable to mount the additional rib 108.

In the production process of the wing, the ribs are put together using the plastic joints and T-pieces in order to produce the ribbed frame 100. Thereafter, the ribbed frame 100 is spanned in a mould that will be used in an injection moulding process wherein the ribbed frame 100 is integrated in a foam wing.

Figure 2:
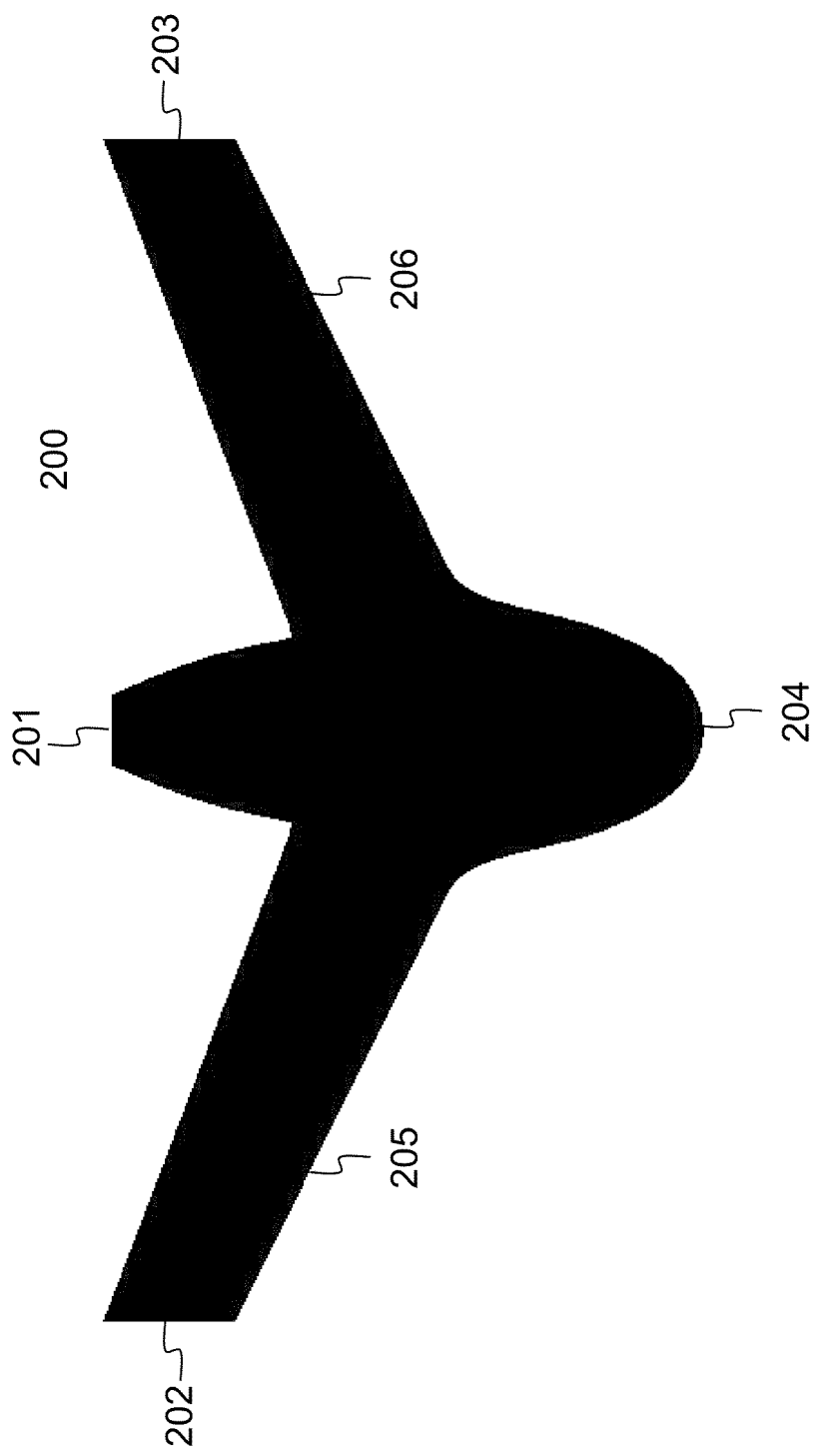
FIG. 2 illustrates the foam in an embodiment of the wing according to the present invention.

The foam wing 200 is shown in FIG. 2. This foam wing 200 consists of a relatively wide central part or fuselage 201, a right part 202 and a left part 203. Through the moulding process, the fuselage 201, right part 202 and left part 203 form a single piece of foam. Alternatives embodiments of the invention can be thought of that have at least on impact side, i.e. the nose 204 of fuselage 201, the front border 205 of the right part 202 and the front border 206 of the left part 203, a resilient, foam-based outer surface that makes the wing impact resistant and safe for use in civil areas.

Figure 3:
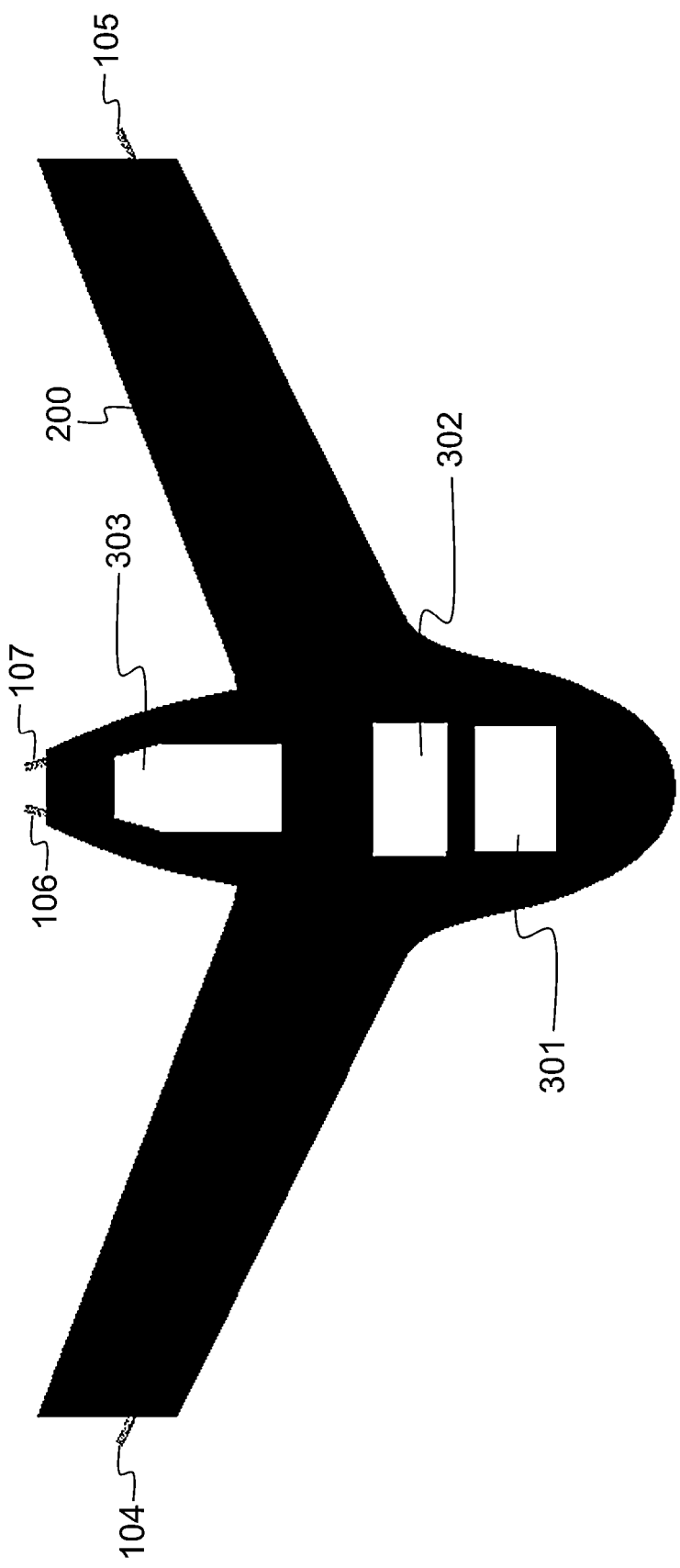
FIG. 3 illustrates the integration of the ribbed frame and foam in an embodiment of the wing according to the present invention.

FIG. 3 illustrates the result of the moulding process, i.e. integration of the ribbed frame 100 in the foam wing 200. The right wing rib 104, left wing rib 105, the back starboard rib 106 and back portside rib 107 are visible in FIG. 3. Further, this figure shows three compartments or cambers that are created in the fuselage of the wing 200 through the moulding process. The front camber 301 shall serve as container for the battery of the aircraft. The middle camber 302 shall serve as container for the camera or sensors. The rear camber 303 shall serve as container for the control electronics and electric propulsion of the aircraft. The container principle of the wing that is realized through the moulding better protects the expensive electric and electronic components in case of impact or crash, allows to access, repair and replace these components in case of failure or damage, and enables to recuperate the electronics for use in another wing in case the wing is damaged or has reached its lifetime end. The three compartments and the relative position of battery, camera, and control electronics as outlined above further improves the stability of the unmanned aircraft destined for image acquisition applications.

Figure 4:
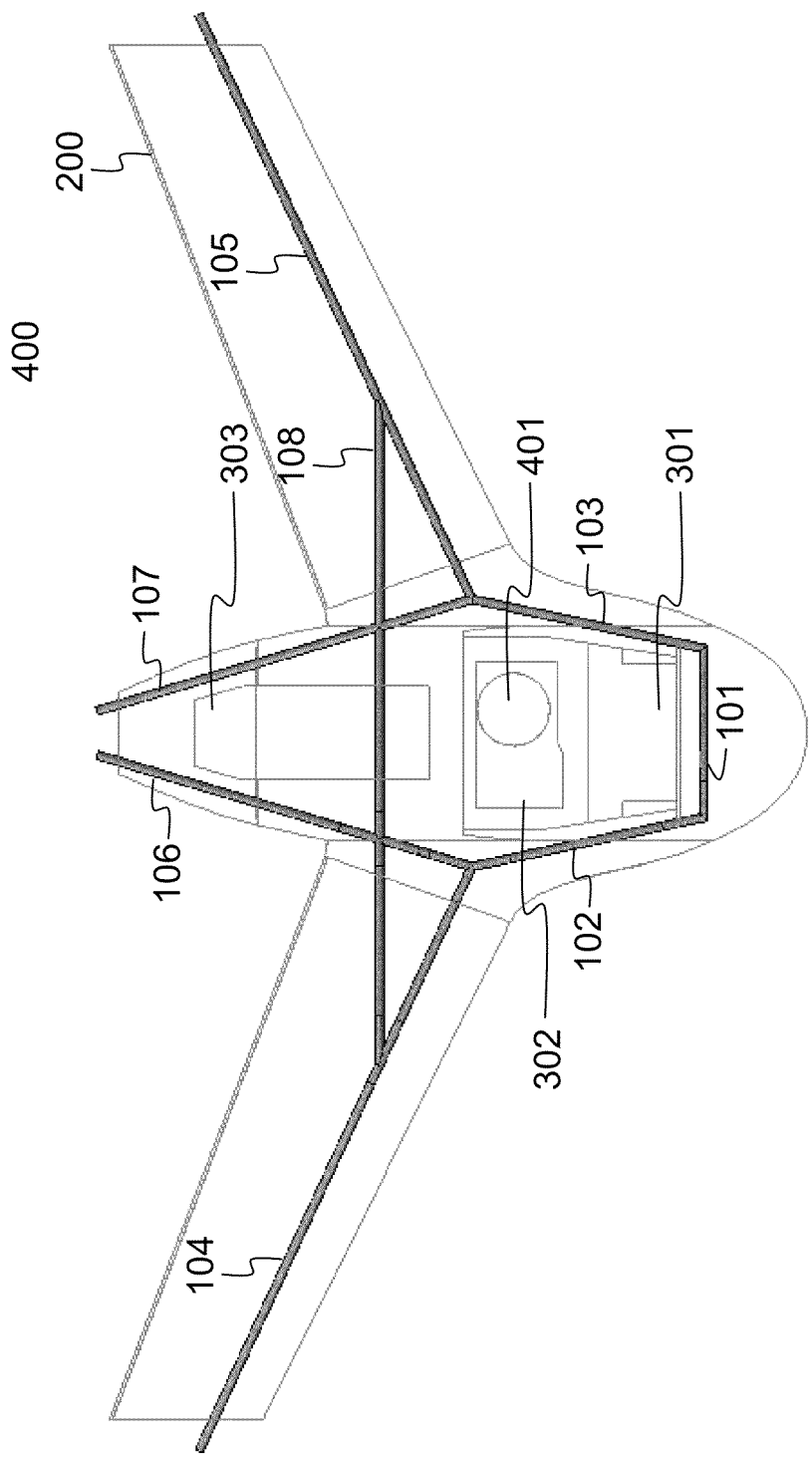
FIG. 4 illustrates an embodiment of the unmanned aircraft according to the present invention.

FIG. 4 at last shows the unmanned aircraft 400 based on the wing with foam 200 and integrated ribbed frame according to the invention. The integrated frame corresponds to frame 100 in FIG. 1 and has ribs 101, 102, 103, 104, 105, 106, 107 and 108, interconnected through plastic joints and T-pieces as described here above in relation to FIG. 1. The frame is embedded in foam 200 with container for electronics. The container consists of a first camber 301 that holds the battery, second camber 302 that holds the camera, and third camber 303 that holds the electric motor and control electronics. The second camber 302 has a circular aperture 401 in the foam bottom for the lens of the camera. This aperture 401 is also created during the moulding process and consequently does not complicate the manufacturing process.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. An unmanned aircraft for image acquisition or surveillance, the unmanned aircraft having a foam wing including a fuselage, a right part and a left part forming a single piece of foam obtained through injection molding, said unmanned aircraft comprising:
   a ribbed frame; and
   said single piece of foam wherein said ribbed frame is integrated during said injection molding for stiffness and strength, said single piece of foam having a container for holding electric and/or electronic components including image acquisition electronics, and said single piece of foam constituting, at least at an impact side, an outer layer of said unmanned aircraft, the impact side including a nose of the fuselage, a front border of the right part and a front border of the left part.

2. The unmanned aircraft of claim 1,
   said single piece of foam and integrated ribbed frame being removable and replaceable without disposing said electronic components.

3. The unmanned aircraft of claim 1,
   wherein said container contains at least three compartments:
   a front section for holding a battery;
   a middle section for holding a camera; and
   a rear section for holding electronic control circuitry and an engine.

4. The unmanned aircraft of claim 1,
   wherein said container comprises a lid enabling access to said electronic components.

5. The unmanned aircraft of claim 1,
wherein said ribbed frame comprises at least one of:
carbon;
aluminum;
fiber glass;
plastic;
wood; or
composite material.

6. The unmanned aircraft of claim 1,
wherein said single piece of foam comprises at least one of:
polystyrene;
polypropylene; or
expanded polypropylene (EPP).

7. An unmanned aircraft having a foam wing including a fuselage, a right part and a left part forming a single piece of foam obtained through injection molding, said unmanned aircraft comprising:
a ribbed frame; and
said single piece of foam wherein said ribbed frame is integrated during said injection molding for stiffness and strength, said single piece of foam having a container for holding electric and/or electronic components, and said single piece of foam constituting, at least at an impact side, an outer layer of said unmanned aircraft, the impact side including a nose of the fuselage, a front border of the right part and a front border of the left part, wherein said container includes:
a battery;
image acquisition electronics;
control electronics; and
an engine.

8. The unmanned aircraft of claim 7, wherein said single piece of foam and ribbed frame is removable and replaceable without disposing said electronic components.

9. The unmanned aircraft of claim 7, wherein said container contains at least three compartments:
a front section for holding the battery;
a middle section for holding the image acquisition electronics; and
a rear section for holding the control electronics and the engine.

10. The unmanned aircraft of claim 7, wherein said container comprises a lid enabling access to said electronic components.

11. The unmanned aircraft of claim 7, wherein said ribbed frame comprises at least one of:
carbon;
aluminum;
fiber glass;
plastic;
wood; or
composite material.

12. The unmanned aircraft of claim 7, wherein said single piece of foam comprises at least one of:
polystyrene;
polypropylene; or
expanded polypropylene (EPP).

* * * * *